Figure 1:
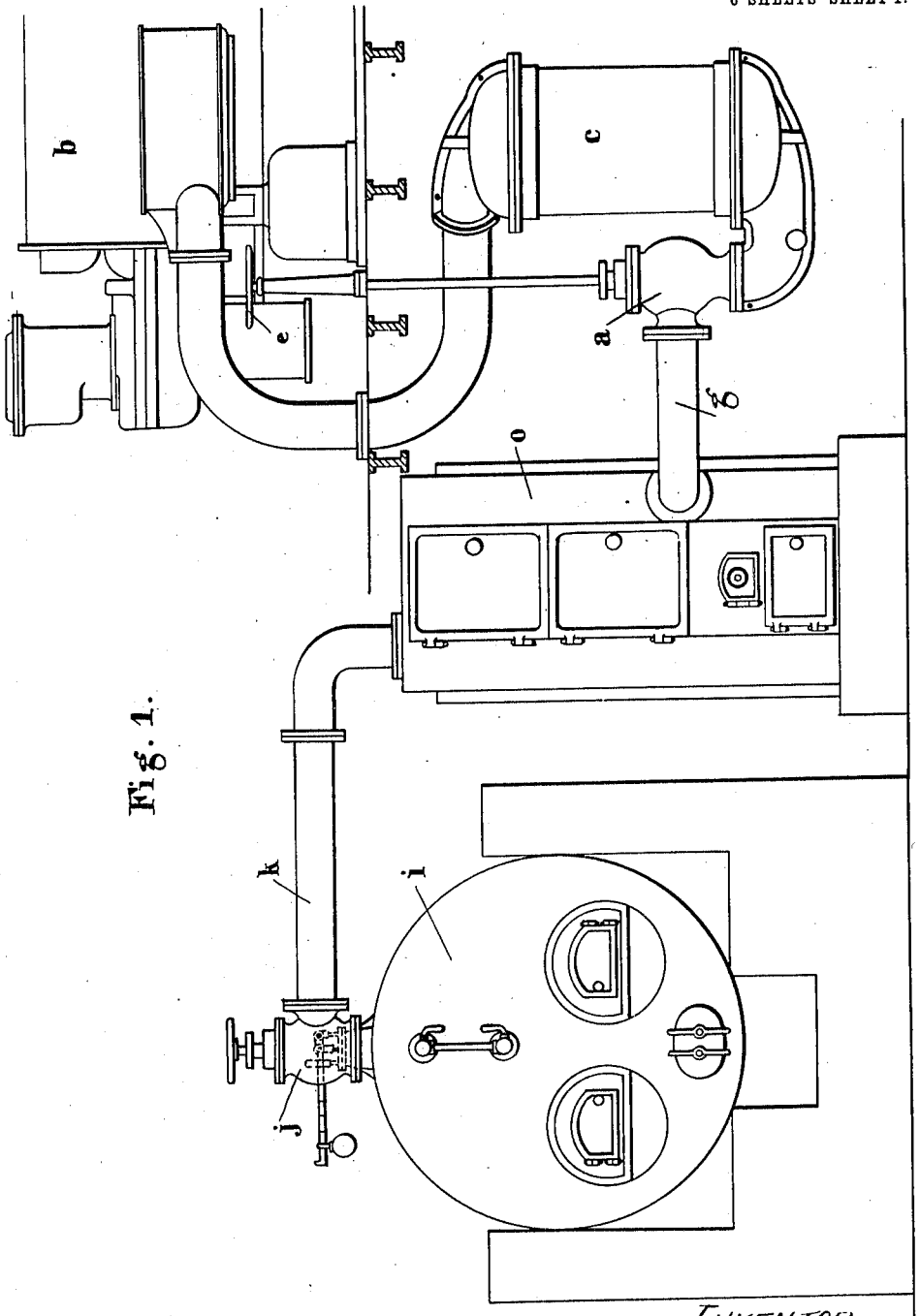

C. A. PARSONS.
MEANS FOR PREVENTING A QUICK HEATING OF MOTORS OPERATED BY HOT FLUID.
APPLICATION FILED MAR. 30, 1908.

986,941.

Patented Mar. 14, 1911.

6 SHEETS—SHEET 2.

C. A. PARSONS.
MEANS FOR PREVENTING A QUICK HEATING OF MOTORS OPERATED BY HOT FLUID.
APPLICATION FILED MAR. 30, 1908.

986,941.

Patented Mar. 14, 1911.

6 SHEETS—SHEET 3.

C. A. PARSONS.
MEANS FOR PREVENTING A QUICK HEATING OF MOTORS OPERATED BY HOT FLUID.
APPLICATION FILED MAR. 30, 1908.
986,941.
Patented Mar. 14, 1911.
6 SHEETS—SHEET 4.
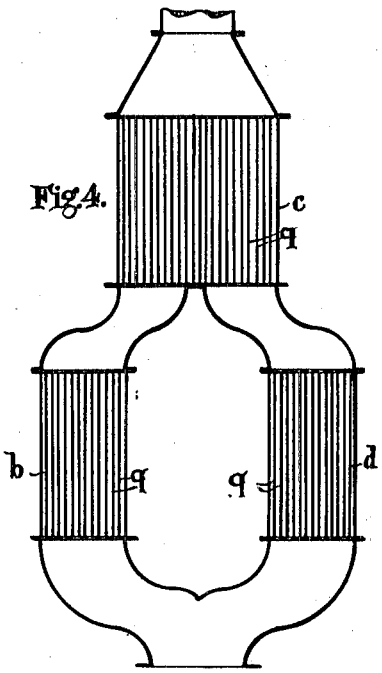
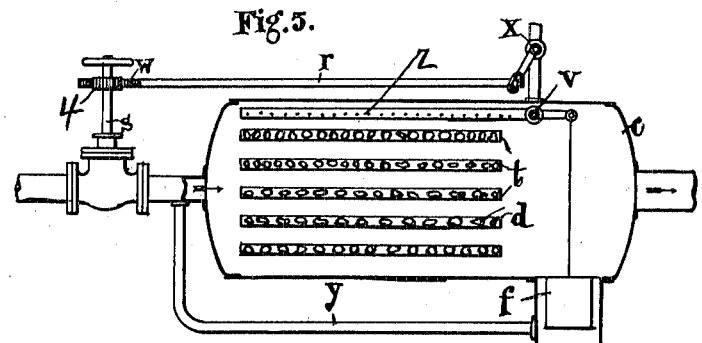
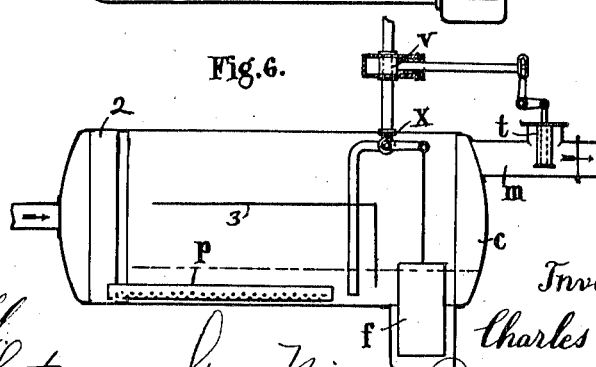
Attest.
Bent M. Stahl
Edward N. Sarton
Inventor.
Charles A. Parsons
By Spear, Middleton, Donaldson & Spear
Atty's C. A. PARSONS.
MEANS FOR PREVENTING A QUICK HEATING OF MOTORS OPERATED BY HOT FLUID.
APPLICATION FILED MAR. 30, 1908.

986,941.

Patented Mar. 14, 1911.
6 SHEETS—SHEET 5.

Attest:
Ewd R. Tolson
Edward N. Sexton

Inventor:
Charles Algernon Parsons.
By Shear Middleton Donaldson
Attys.

C. A. PARSONS.
MEANS FOR PREVENTING A QUICK HEATING OF MOTORS OPERATED BY HOT FLUID.
APPLICATION FILED MAR. 30, 1908.

986,941.

Patented Mar. 14, 1911.

6 SHEETS—SHEET 6.

Attest:
Ewd L. Tolson
Edward N. Stanton

Inventor:
Charles Algernon Parsons
By Spear Middleton Donaldson
Attys.

UNITED STATES PATENT OFFICE.

CHARLES ALGERNON PARSONS, OF NEWCASTLE-UPON-TYNE, ENGLAND.

MEANS FOR PREVENTING A QUICK HEATING OF MOTORS OPERATED BY HOT FLUID.

986,941.

Specification of Letters Patent.   Patented Mar. 14, 1911.

Application filed March 30, 1908.   Serial No. 424,170.

*To all whom it may concern:*

Be it known that I, CHARLES ALGERNON PARSONS, C. B., a subject of the King of Great Britain and Ireland, and residing at Heaton Works, Newcastle-upon-Tyne, in the county of Northumberland, England, have invented certain new and useful Means for Preventing a Quick Heating of Motors Operated by Hot Fluid, of which the following is a specification.

This invention relates to the adjustment or control of the heating of motors operated by hot fluids such as steam or gas. Rapid variation of the temperature of the hot fluid supply to such motors causes abnormal stresses and strains in the metal of parts of the motor consequent upon local changes of temperature in the motor. This is particularly the case at the high pressure or the inlet portion of the motor and in extreme cases may cause distortion or rupture of the metal. For instance, an engine or turbine operating with highly superheated steam or gas, may be greatly damaged by supplying it with superheated steam when starting it, that is, before it has been warmed up.

The object of this invention is to enable the temperature of the working fluid to be so controlled that a sudden change in the temperature of the fluid supplied to the motor and consequent stressing of any parts thereof shall not take place even though the stop valve be not controlled with good judgment.

The invention consists in the employment of a thermal accumulator between the hot fluid supply or delivery and the motor first receiving said hot fluid in order to prevent the working fluid from entering the motor at high temperature until the motor has been warmed up so as to prevent local excessive differences of temperature and the distortion or fracture of any part of the motor consequent thereon.

Figure 2:
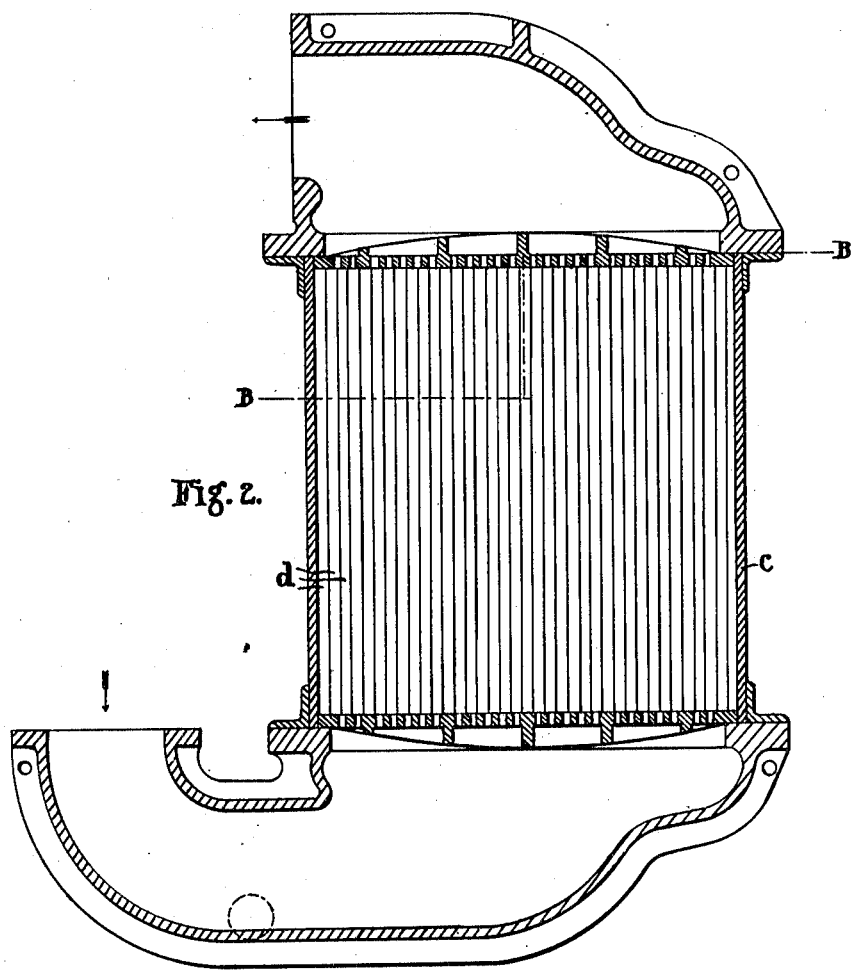
Figure 3:
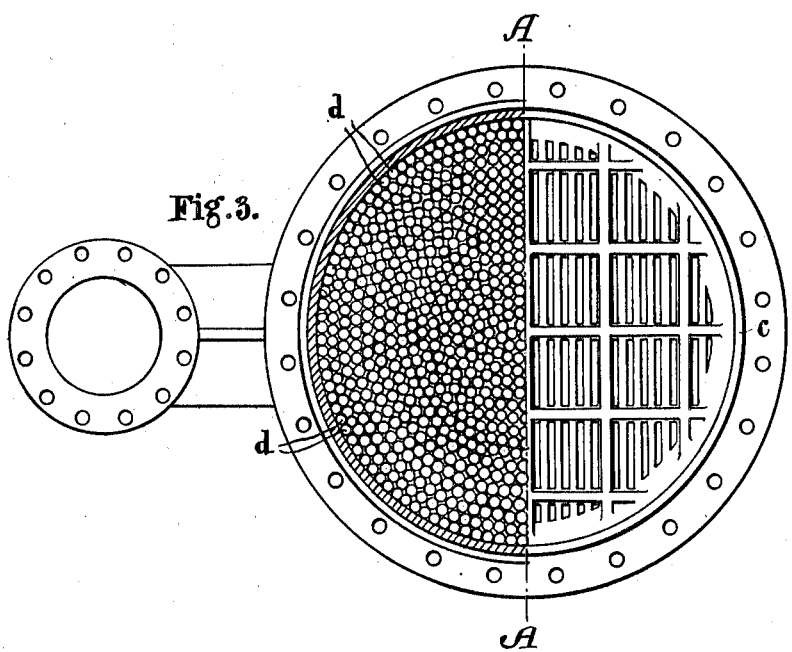

Referring now to the accompanying drawings which form part of this specification; Figure 1 shows the general arrangement of a turbine plant embodying the present invention, and Fig. 2 is a sectional elevation on line A—A of Fig. 3, illustrating one method of carrying the invention into effect; Fig. 3 is a sectional plan on the line B—B of Fig. 2; Fig. 4 shows a modified form of the device shown in Fig. 2, while Figs. 5, 6, 7, 8 and 9 illustrate further modifications.

In carrying my invention into effect according to one form, see Figs. 1, 2 and 3, I place between the throttle valve, $a$, which is operated by the hand wheel, $e$, and the motor, (which in the drawings is a turbine having the usual regulating and controlling gear and is indicated generally by the reference letter $b$,) a metal cylinder, $c$, filled with metal, or other material of a high specific heat, in moderately minute division. In Figs. 2 and 3, this metal is in the form of rods, $d$; other forms however may be used, such as corrugated tubes (see Fig. 7) ribbed bars, lumps of metal (see Fig. 8) or the like, which will expose a large area to the steam passing therethrough. Whatever the form of the material of the accumulator may be, the mass of such material must bear a considerable ratio to the mass of material of the motor to be protected.

Fig. 4 illustrates a modified form in which a bundle of rods or tubes, $q$, are arranged in a casing or casings in parallel or parallel series.

Figure 9:
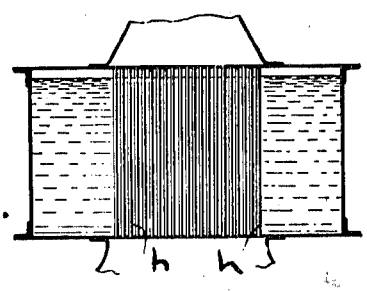
Figure 7:
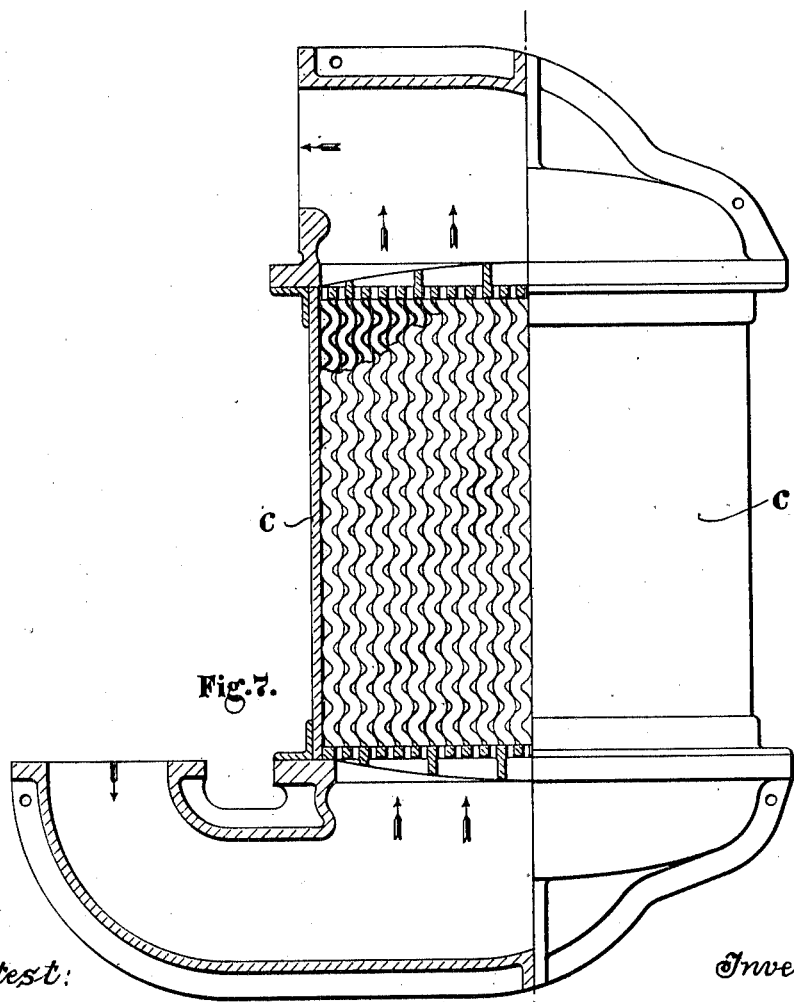
Figure 8:
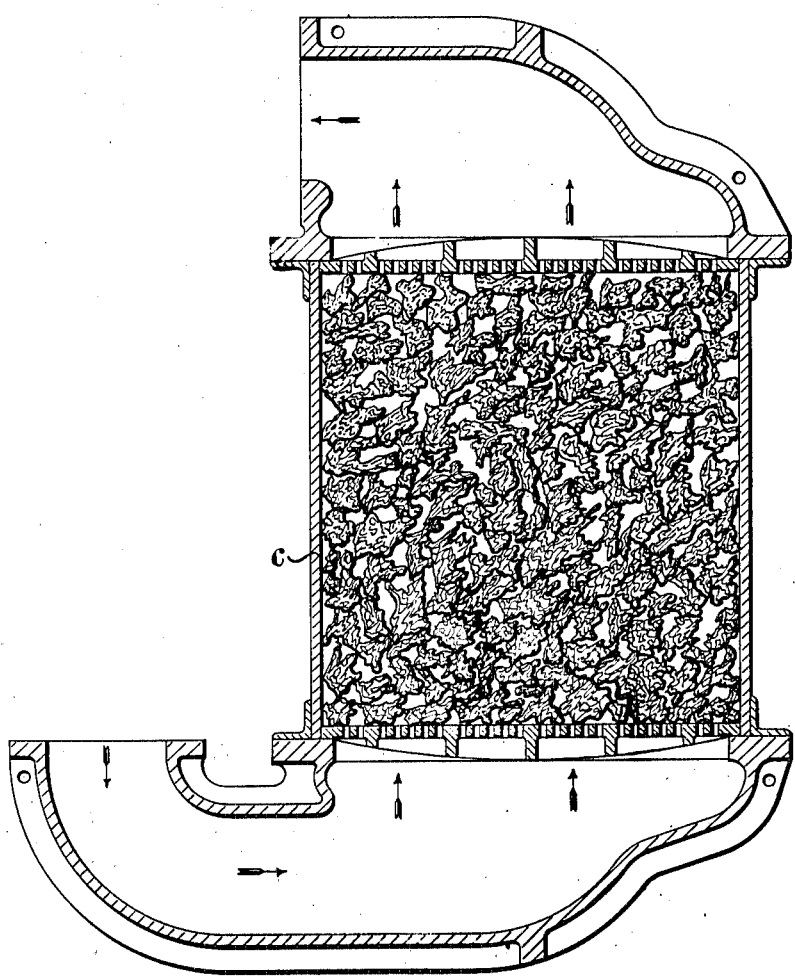

In a further modification, steam may be carried through a number of small pipes, $h$, in parallel, and said pipes may be immersed in a fluid of high specific heat analogous to an ordinary surface condenser; this modification is shown in Fig. 9.

The manner in which the apparatus operates is as follows:—The hot fluid having been generated in the element $i$, which in this case is a boiler supplying steam, passes through the valve, $j$, and pipe, $k$, into the superheater, $o$, and on opening the stop valve, $a$, it passes from thence by the pipe, $g$, into the accumulator, $c$, and at first gives up much of its heat to the material of the accumulator. The temperature of the steam is thus much lowered and there will be some condensation. The absorption of heat by the mass of the accumulator, $c$, produces a considerable time interval (after the opening of the throttle valve) before any steam at a temperature above saturation point can reach the turbine, $b$; but during this time interval the motor, $b$, becomes gradually heated up so that when superheated steam does enter there is no sudden excessive local heating and no consequent excessive local expansion. Further, the accumulator, c, not only effectually protects the turbine, b, from any sudden rise of temperature of the motive fluid but by suitably adjusting the amount of metal or other heat absorbing mass used it may be arranged to limit the rate of the variations in the temperature of the working fluid received by the motor while running, that is, that with a certain rate of increase or decrease in the temperature of the working fluid entering the accumulator, c, the rate of the corresponding increase or decrease in the temperature of the working fluid leaving the accumulator and entering the turbine is much slower and as a consequence the increase or decrease in temperature of the working fluid entering the turbine continues after the change of temperature of the working fluid entering the accumulator has ceased, and reaches its greatest change later, the accumulator thus produces a time lag in the variations of the temperature of the working fluid entering the motor, and this is what must be understood by the expression "time lag" both in the specification and the claims.

Further arrangements are shown diagrammatically in Figs. 5 and 6. In Fig. 5, the device consists of a shell, c, with trays, t, containing lumps of material, d, over which a quantity of water may be delivered under pressure by spraying by means of a perforated pipe, z, or in any other suitable manner, the supply of this water being controlled by a float, f, controlling a water supply valve, v. Another valve, x, in the water supply is coupled to the throttle valve by suitable means, such as a rod, r, having a rack, w, gearing with a pinion, 4, on the stop valve spindle, s, this rod being connected to the operating lever of the water valve, x. When the throttle valve, a, is closed the water valve, x, is open and water sprays in to the chamber, c, over the trays of material until the float is raised and the valve, v, shut. When the throttle valve, a, is open the water valve, x, is closed, and the incoming steam evaporates, the water remaining on the trays, and on again closing the stop valve, a, water flows in until stopped by the float, f, when the accumulator is ready for a fresh start.

As a further modification the steam may be delivered through the chamber, c, (Fig. 6,) containing or supplied with a limited quantity of water or other suitable fluid, the steam being caused to pass through or in contact with this water or other fluid by means for example, of the perforated pipe, p, immersed in the fluid. By this means the passage of superheated steam is prevented until the water contained in the chamber, c, is evaporated, its temperature being kept for the time below saturation point. Automatic means may be provided for controlling the supply of water so that after a certain time the water supply may be stopped and the water remaining in the chamber may be evaporated by the hot steam or other fluid entering the chamber. Automatic means may be further arranged to restart the supply of water if the temperature of the steam should rise above a predetermined point. The chamber, c, (see Fig. 6) contains a divided off portion 2 from which the steam passes by way of perforated pipes, p, into the water and escapes to the outlet pipe, m, the baffle plate, 3, preventing water being carried over to the motor. The automatic means may comprise a float, f, controlling a valve, x, and a thermostat, t, in the outlet pipe, m, controlling a valve, v, in the water inlet pipe. This valve may be of the slide valve type. The thermostat, t, is so arranged that when it is cold, the valve, v, is open and at normal superheat the valve, v, is closed. A further rise in temperature again opens valve, v, allowing the water to flow in until stopped by the float, f, closing the valve, x, or by the thermostat, t, cooling sufficiently to close the valve. The device in this form acts as a heat regulator during the running of the motor as well as a safety starter.

The accumulators may in all cases be suitably lagged with non-conducting materials.

In all cases gas or other fluid may be used instead of steam.

Having now described my invention what I claim as new and desire to secure by Letters Patent is:—

1. In a plant having a heat motor operated by hot fluid, a generator continuously supplying fluid to said motor, a heat absorbing device placed externally to and between the generator and said motor, and comprising material capable of absorbing heat from the fluid thereby preventing said motor from being subjected to a sudden increase of temperature when starting but allowing superheated fluid to pass to the motor after the motor has assumed its normal working temperature.

2. In a plant having a heat motor operated by a hot elastic fluid, a generator continuously supplying fluid to said motor, a device placed between said generator and the motor and comprising material capable of absorbing heat from the fluid, and valve means placed in front of said element and controlling the flow of fluid to said motor, whereby on opening said valve means to start the motor, said heat absorbing device prevents the motor being subjected to a sudden increase of temperature and automatically allows superheated fluid to pass when the motor has attained its normal working temperature.

3. In combination in a plant having a heat motor operated by hot elastic fluid, a generator continuously supplying said motor with fluid, a device capable of absorbing heat from said fluid and placed between said generator and the motor, said device consisting of a heat absorbing material non-vaporative under the normal running conditions of said motor whereby on starting the motor said device prevents said motor from being subjected to a sudden increase of temperature and supplies the same with dry superheated fluid when the normal conditions of running have been attained.

4. In combination in a plant having a heat motor operated by hot elastic fluid, a generator continuously supplying said motor with fluid, a device placed between said generator and heat motor absorbing heat from said fluid, consisting of a heat absorbing material and means for spraying said material with liquid when said motor is started whereby said device prevents the motor being subjected to a sudden increase of temperature and allows dry fluid to be supplied to the motor when the normal running conditions have been attained.

5. In combination in a plant having a heat motor operated by hot elastic fluid, a generator continuously supplying said motor with fluid, a device placed between the generator and the motor and absorbing heat from said fluid, valve means controlling the supply of fluid to the motor, said device consisting of a heat absorbing material and means for automatically spraying said material with liquid when said valve means are opened thereby preventing the motor being subjected to a sudden increase in temperature and means for cutting off automatically the supply of spraying liquid when the motor has attained its normal running condition and can be supplied with superheated fluid.

6. In combination in a plant having a heat motor operated by hot elastic fluid, a generator continuously supplying said motor with fluid, a device placed between the generator and the motor and absorbing heat from said fluid, valve means controlling the supply of fluid to the motor, said device consisting of a heat absorbing material and means for automatically spraying said material with liquid when said valve means are opened thereby preventing the motor being subjected to a sudden increase of temperature and with a thermostat for cutting off automatically the supply of spraying liquid when the motor has attained its normal running condition and can be supplied with superheated fluid.

7. In combination in an elastic fluid operated plant a steam boiler, a turbine supplied with superheated steam from said boiler, a connection between said boiler and turbine, a device placed in said connection and comprising a material capable of absorbing heat from said superheated steam but allowing superheated steam to pass to the turbine whereby on starting said turbine, said device prevents the turbine being subjected to a sudden increase of temperature but allows superheated steam to pass thereto when the working temperature has been attained.

8. In combination in a steam turbine plant, an element generating superheated steam, a turbine supplied with steam from said element, a connection between said element and the turbine, a device placed in said connection and comprising a chamber, a non-vaporizable material therein capable of absorbing heat from said steam whereby on starting said turbine said device prevents the turbine being subjected to a sudden increase of temperature by absorbing heat from said steam until the turbine has attained its working temperature when superheated steam is then allowed to pass to the same.

9. In combination in a steam turbine plant, an element generating superheated steam, a turbine supplied with said steam, a connection between said element and turbine, a device placed in said connection and comprising a chamber, a nonvaporizable material therein, means for supplying said material with a vaporizable liquid means for automatically shutting off the supply of said liquid when the turbine has attained its working temperature whereby on starting said turbine said device prevents a sudden flow of superheated steam to the turbine but allows the latter to be supplied with superheated steam when the normal working temperature has been attained.

10. In combination in an elastic fluid operated plant, an element generating superheated fluid, a motor supplied with said fluid, a connection between said element and motor, a device placed in said connection and comprising a chamber, a porous filling therein holding segregated portions of liquid, means for supplying said liquid motor starting means connected to said fluid supplying means, and means subjected to the temperature of said chamber for automatically closing said fluid supply means, whereby on starting said motor the latter is prevented from being subjected to a sudden increase of temperature but after having attained its normal temperature of working, the motor is supplied with superheated fluid.

11. In combination in an elastic fluid operated plant, an element generating superheated fluid, a motor supplied with said fluid, a connection between said element and motor, valve means admitting fluid to said motor, a device placed in said connection between said valve means and motor, comprising a chamber a heat absorbing material therein, means connected to said valve means for spraying said material with water, and means for cutting off the supply of water when the temperature of said chamber has risen to a predetermined amount, whereby on opening said valve means to admit hot fluid to said motor, said device by absorbing heat from said fluid prevents the motor being subjected to a sudden increase of temperature, but when the motor has attained its normal temperature of working, the supply of water to the said chamber is cut off and the motor supplied with superheated fluid.

In testimony whereof, I affix my signature in presence of two witnesses.

CHARLES ALGERNON PARSONS.

Witnesses:
HENRY GRAHAM DAKYNS, Jr.,
WILLIAM MENZIES JOHNSTON.